(12) United States Patent
Guilloteau

(10) Patent No.: US 8,547,136 B1
(45) Date of Patent: Oct. 1, 2013

(54) LOGIC BLOCK PROTECTION SYSTEM

(75) Inventor: Patrick Guilloteau, Palaiseau (FR)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/295,025

(22) Filed: Nov. 11, 2011

(51) Int. Cl.
*H03K 19/173* (2006.01)

(52) U.S. Cl.
USPC .................. 326/38; 326/39; 726/27; 713/190

(58) Field of Classification Search
USPC .................... 326/37–39; 726/26–27; 714/27; 713/155, 189–190
See application file for complete search history.

(56) References Cited

U.S. PATENT DOCUMENTS

| | | | |
|---|---|---|---|
| 7,818,584 B1 * | 10/2010 | Joyce et al. | 713/189 |
| 2006/0072762 A1 * | 4/2006 | Buer | 380/277 |
| 2006/0136717 A1 * | 6/2006 | Buer et al. | 713/155 |
| 2008/0005586 A1 * | 1/2008 | Munguia | 713/189 |
| 2008/0016395 A1 * | 1/2008 | Feng | 714/27 |
| 2011/0067110 A1 * | 3/2011 | Markey et al. | 726/26 |

* cited by examiner

*Primary Examiner* — Jason M Crawford

(74) *Attorney, Agent, or Firm* — Womble Carlyle Sandridge & Rice, LLP

(57) ABSTRACT

An integrated circuit (IC) with an Intellectual Property (IP) protection system is disclosed. The IC includes a memory array operable to store a key. The key is a sequence of binary bits. The IC also has an IP block operable to perform a function. The IP block is defined through the circuitry of the IC. The IP block is also operable to be activated with the key. The IC has an interconnection operable to couple the memory array to the IP block. The interconnection transfers the key from the memory array to the IP block. A method to configure and to operate the IC is also provided.

20 Claims, 4 Drawing Sheets

LOGIC BLOCK PROTECTION SYSTEM

BACKGROUND

An integrated circuit (IC) performs logic functions through circuitry within the IC. Examples of such a circuit may include input/output (I/O) interfaces, storage buffers, processing units, etc. Each circuit has an associated function, e.g., a storage buffer, such as a memory element that stores information/data for later usage. A group of such circuitry that performs a function is known as Intellectual Property (IP) block.

Field Programmable Gate Arrays (FPGAs) are configured to perform a function through the implementation of IP blocks. Inserting configuration information into the FPGAs may define the IP block(s). The configuration data enables functionality of the FPGAs by configuring programmable logic elements. The IP blocks formed by way of the configuration data are also known as soft IP blocks.

The FPGA is known for its flexibility in inserting any type of soft IP blocks. The FPGA can be programmed from one soft IP block to another. As such, FPGA companies may not be able to control types of IP blocks the FPGA may support. Furthermore, soft IP blocks may be propriety designs of FPGA companies or of a third party design house and these entities may desire to protect the soft IP blocks from unauthorized use.

It is within this context that the embodiments described herein arise.

SUMMARY

Embodiments described herein include an IC and a method to provide protection for IP blocks within the IC. It should be appreciated that the embodiments can be implemented in numerous ways, such as a process, an apparatus, a system, a device, or a method. Several embodiments are described below.

In one embodiment, an IC with the IP protection feature is described. The IC includes a memory array operable to store a key. The key is a sequence of binary bits. The IC also has an IP block operable to perform a function. The IP block is defined through the circuitry of the IC. The IP block is also operable to be activated with the key. The IC also has an interconnection operable to couple the memory array to the IP block. The interconnection transfers the key from the memory array to the IP block.

In another embodiment, a method to operate the IC with the IP protection feature is described. The method includes transferring a key to a memory array. Next the key is stored in a location within the memory array, where the location is accessible by the IP block operable to perform a function. The method also includes transferring the key from the memory array to the IP block. Finally, the method also includes enabling the IP block with the key.

In another embodiment, a method to configure the IC to have the IP protection feature is described. The method includes receiving configuration information that configures at least a portion of circuitry of the IC to perform a function. The portion of circuitry forms an IP block within the IC. The method also includes receiving a key that enables the IP block, where the key is a sequence of binary bits stored in a location within a memory array. Finally the method also includes activating the IP block with the key.

Other aspects of the embodiments will become apparent from the following detailed description, taken in conjunction with the accompanying drawings, illustrated by way of example.

BRIEF DESCRIPTION OF THE DRAWINGS

The embodiment may be understood by reference to the following description taken in conjunction with the accompanying drawings.

DETAILED DESCRIPTION

The following embodiments describe an IC and a method to provide an IP protection system within the IC.

It will become apparent, to one skilled in the art, that the present embodiment may be practiced without some or all of these specific details. In other instances, well-known operations have not been described in detail in order not to unnecessarily obscure the present embodiment.

The embodiments described below illustrate an IC with the IP protection feature. The IC with the IP protection feature prevents the exploitation of IP blocks by an unauthorized user. The IC with the IP protection feature also enables a marketable avenue for providing IP blocks upon payment of a royalty. The IC utilizes a key stored in a memory array to activate the IP block functions.

Figure 1:
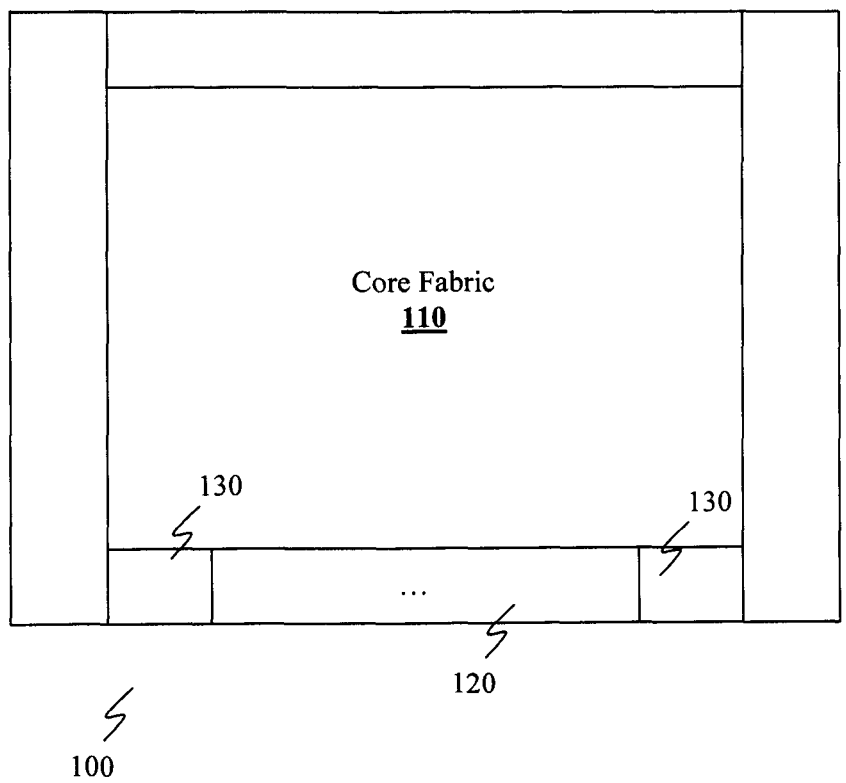
FIG. 1, meant to be illustrative and not limiting, illustrates an integrated circuit (IC) in accordance with one embodiment.

FIG. 1, meant to be illustrative and not limiting, illustrates an integrated circuit (IC) in accordance with one embodiment. IC 100 can be a Programmable Logic Device (PLD), Field Programmable Gate Array (FPGA), Application Specific Integrated Circuit (ASIC) or Application Specific Standard Product (ASSP). It should be appreciated that IC 100 refers to any device fabricated utilizing a semiconductor process.

IC 100 has a core fabric 110 and an Input Output (IO) periphery 120. Core fabric 110 may have programmable logic elements. The programmable logic elements are configurable to perform logic functions such as signal processing, signal storing, etc. IC 100 may also have programmable routings that enables communication between the programmable logic elements. FPGAs and PLDs have both programmable logic elements and programmable interconnections. It is appreciated that there are also many other circuits within IC 100, e.g., memory arrays, Digital Signal Processors (DSP) blocks and Phase Lock Loops (PLL) blocks.

IO periphery 120 surrounds core fabric 110 at the edges of IC 100. IO periphery 120 enables communication with external devices (not shown) through IO pins (also not shown). IO periphery 120 enables transferring signal in and out of IC 100. The signal, received by IC 100, will be transferred to core fabric 110 for applying a logic function. The signal outputted from IC 100 can be handled by external devices.

IO periphery 120 includes a plurality of IO ports 130. Each of IO ports 130 may receive/transmit signals. In one embodiment, IO port 130 is a Joint Test Action Group (JTAG) port. It should be appreciated that the JTAG port enables a standard method of handling the incoming/outgoing signals. IO port 130 may be configurable to receive different signals, e.g., signals having various frequency, electrical voltage or current levels.

Figure 2:
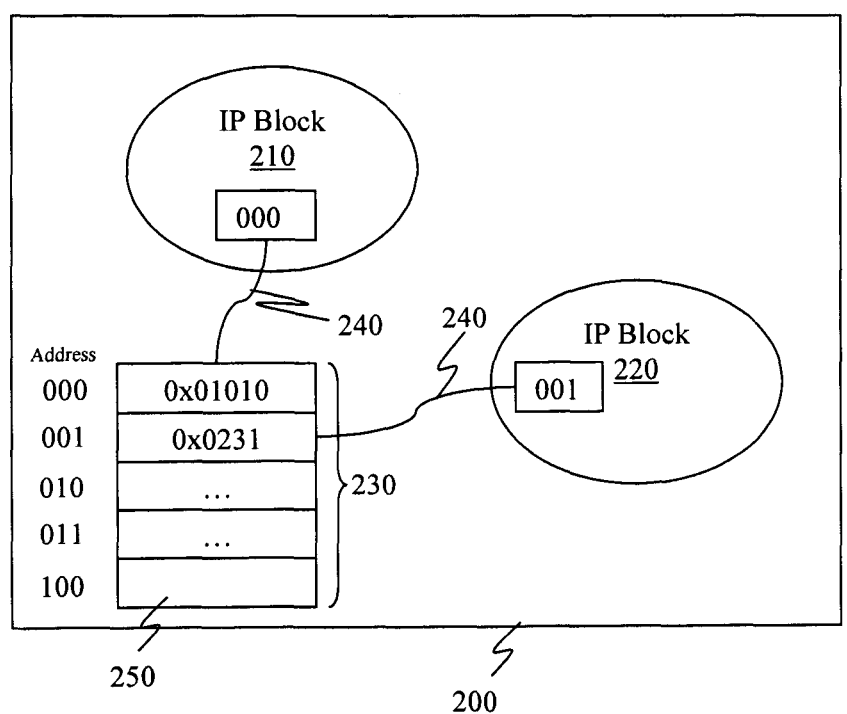
FIG. 2, meant to be illustrative and not limiting, illustrates an IC with an IP protection feature in accordance with one embodiment.

FIG. 2, meant to be illustrative and not limiting, illustrates an IC with an IP protection feature in accordance with one embodiment. IC 200 is similar to IC 100 of FIG. 1 with the addition of the IP protection feature. IC 200 has IP blocks 210 and 220, a memory array 230 and interconnections 240.

Memory array 230 is built from a plurality of memory elements 250 arranged contiguously. It is to be appreciated that memory elements 250 can be arranged physically contiguous, i.e., a memory element 250 placed next to another memory element 250 on a layout floor plan of IC 200, or can be arranged electrically contiguous, i.e., a memory element 250 is placed next to another memory element 250 according to a sequential electrical address. Memory elements 250 have associated addresses for reference. Memory element 250 can be accessed by other circuitry of IC 100 if the address is known. The address for a first memory element 250 and a second memory element 250 are '000' and '001', respectively.

In one embodiment, memory array 230 can be a non-volatile memory array. Examples of non-volatile memory arrays include FLASH memory arrays, i.e., NAND or NOR memory, and Read Only Memory (ROM) arrays. It is appreciated that the non-volatile memory array allows re-programmability. In another embodiment, memory array 230 can be a One-Time-Programmable (OTP) memory array or a blown antifuse array. Such memory arrays can only be programmed once, and the programmed information may not be altered after the programming.

Memory array 230 can be utilized for storing keys that enable IP blocks 210 and 220. A key is a sequence of binary bits stored in memory element 250. Examples of the sequence of binary bits (represented in hexadecimal for ease) in the embodiments are "0x01010" and "0x0231". The key "0x01010" is stored in address '000' and the key "0x0231" is stored in address '001'. The key can be retrieved if the address of the memory elements 250 is known. For example, the key "0x01010" can be retrieved if the address '000' of memory element 250 is known. The keys enable IP blocks 210 or 220 by enabling their functionality as discussed below.

Memory array 230 has an enabling circuitry (not shown). The enabling circuitry has to be enabled prior to storing of the key in memory elements 250. The enabling circuitry protects access to memory array 230. In one embodiment, the enabling circuitry can be enabled only by a manufacturer of IC 200 or vendors of IP blocks 210 or 220. The activating key for the respective IP blocks 210 or 220 are stored by the manufacturer of IC 200 or the vendor of IP blocks 210 or 220 upon a payment of royalty.

Still referring to FIG. 2, IP blocks 210 and 220 are utilized for performing logic functions. IP blocks 210 and 220 are defined through circuitry of IC 200. Each circuit design is utilized to perform a specific logic function. IP blocks 210 and 220 can be one of a hard IP block, which are defined through physical circuit layout, or a soft IP block, which are defined through configuration of programmable logic elements and programmable routings, e.g., Look-Up-Table (LUT), registers, etc. IP blocks 210 and 220 may perform data processing, handling, transferring, etc. The soft IP blocks can be varied in their design through varying their configuration information.

Each of IP blocks 210 and 220 is embedded with an address of memory element 250 that stores the activation key. For example, IP block 210 is embedded with the address '000'. IP blocks 210 and 220 may retrieve the activation key from the memory element 250 having that particular embedded address.

IP blocks 210 and 220 are activated by the key retrieved from memory elements 250. It is appreciated that the retrieved key has to fit into a binary key hole to activate the respective IP blocks 210 and 220. Therefore, the binary key holes and the keys of IP blocks 210 and 220 have a dependent relationship.

In one embodiment, the binary key hole is a portion of configuration information for IP blocks 210 and 220 that is missing. The keys are the missing configuration information. The missing configuration information can be information controlling signal flows, logic functions and etc. In one embodiment, the missing configuration information is critical for IP blocks 210 and 220 functionalities. It is appreciated that without the missing configuration information, IP blocks 210 and 220 will not be able to function as the circuitry enabling the functionality of the IP blocks 210 and 220 is disabled.

In another embodiment, the binary key hole is where the configuration information of IP blocks 210 and 220 is scrambled, which prevents IP blocks 210 and 220 to function as designed. The key descrambles IP blocks 210 and 220 to unscrambled configuration information, enabling the programmable logic elements to perform their functions as designed. IP blocks 210 and 220 can be descrambled by using methods available in the XOR, Advanced Encryption Standard (AES) or any other available standards. The descrambling of a sequence of bits is performed through the use of the key.

It is appreciated that there are alternative techniques as to how the keys within memory elements 250 and the binary key holes within IP blocks 210 and 220 are dependant. The example described above is exemplary should not be interpreted to limit the embodiments.

Still referring to FIG. 2, interconnections 240 enables bi-directional data transfers. In an FPGA, most of the interconnections are programmable interconnections. The programmable interconnections may span across plurality of programmable logic elements or, in some cases, almost all the programmable logic elements. The programmable interconnection provides pathways from one programmable logic element to another based on the configuration information. In one embodiment, interconnections 240 provide data pathway between IP blocks 210 or 220 and memory array 230. Interconnections 240 can be coupled to memory element 250 by knowing the embedded address in IP blocks 210 or 220. For example, interconnection 240 couples IP block 210, which has the embedded address '000,' to memory element 250, which is addressable through '000' and having the key "0x01010."

Interconnections 240 transfer the key from memory array 230 to IP blocks 210 and 220. The keys are transferred to IP blocks 210 or 220 when the IP blocks require activation. In one embodiment, IP blocks 210 and 220 require the keys immediately after IC 200 has powered-up.

Figure 3:
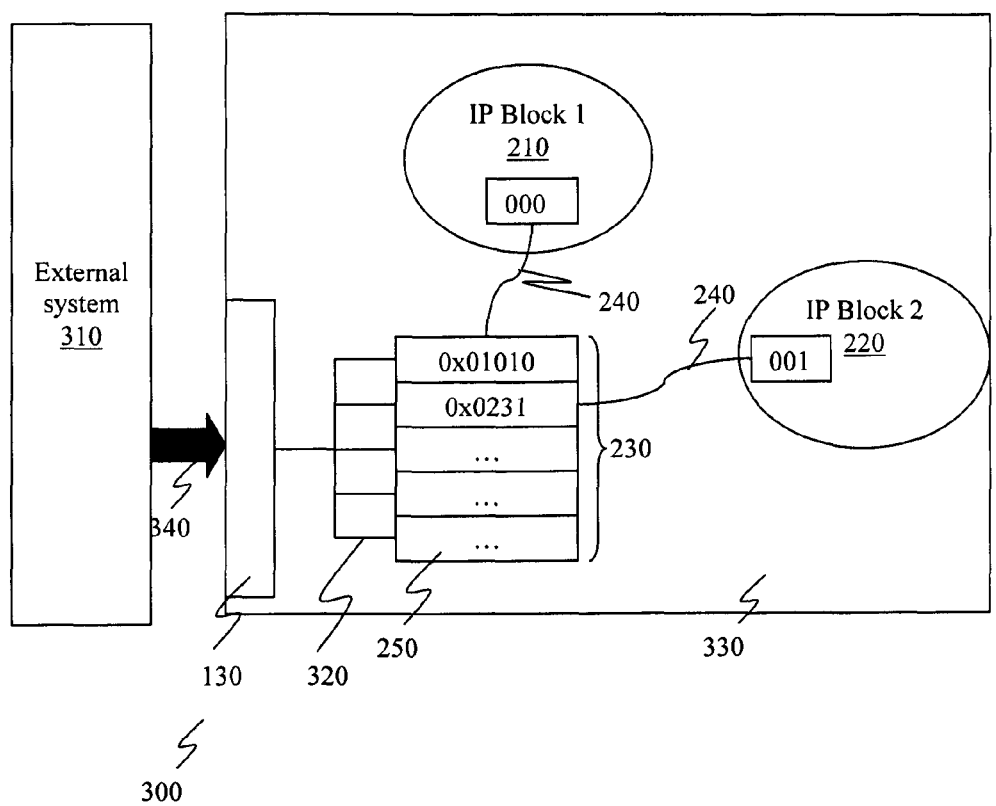
FIG. 3, meant to be illustrative and not limiting, illustrates a system to provide an IP protection feature in accordance with one embodiment.

FIG. 3, meant to be illustrative and not limiting, illustrates a system to provide an IP protection feature in accordance with one embodiment. The system 300 has IC 330 and external system 310. IC 330 is similar to IC 200 of FIG. 2 with the exception of IO port 130 of FIG. 1 and interconnection 320. IC 330 is configured through data 340, which is transferred from external system 310. Data 340 is received by IC 330 via IO port 130.

Interconnection 320 provides a pathway from IO port 130 to memory array 230. In one embodiment, interconnections 320 are similar to interconnections 240 of FIG. 2. Interconnections 320 enables data transfer from IO port 130 to each of memory element 250. In one embodiment, the key is transferred from IO port 130 to memory element 250 by using interconnection 320. Interconnection 320 may provide a pathway for the data to memory array 230 by following sequential addressing. An example of the sequential addressing is as follows: when the data "0x01010" is inserted first and then followed by the data "0x0231" into IC 330, data "0x01010" will be stored in first memory element 250, which can be addressed by '000', whereas data "0x0231" will stored in second memory element 250, which can be addressed by '001'.

Still referring to FIG. 3, external system 310 provides data to IC 330, e.g. configuration information, keys and other types of data. In one embodiment, external system 310 provides the key to activate IP blocks 210 and 220 in IC 330. The keys generated by external system 310 depends on the type of key holes within IP blocks 210 and 220. In one embodiment, external system 310 may be either a tester or a Central Processing Unit (CPU).

Figure 4:
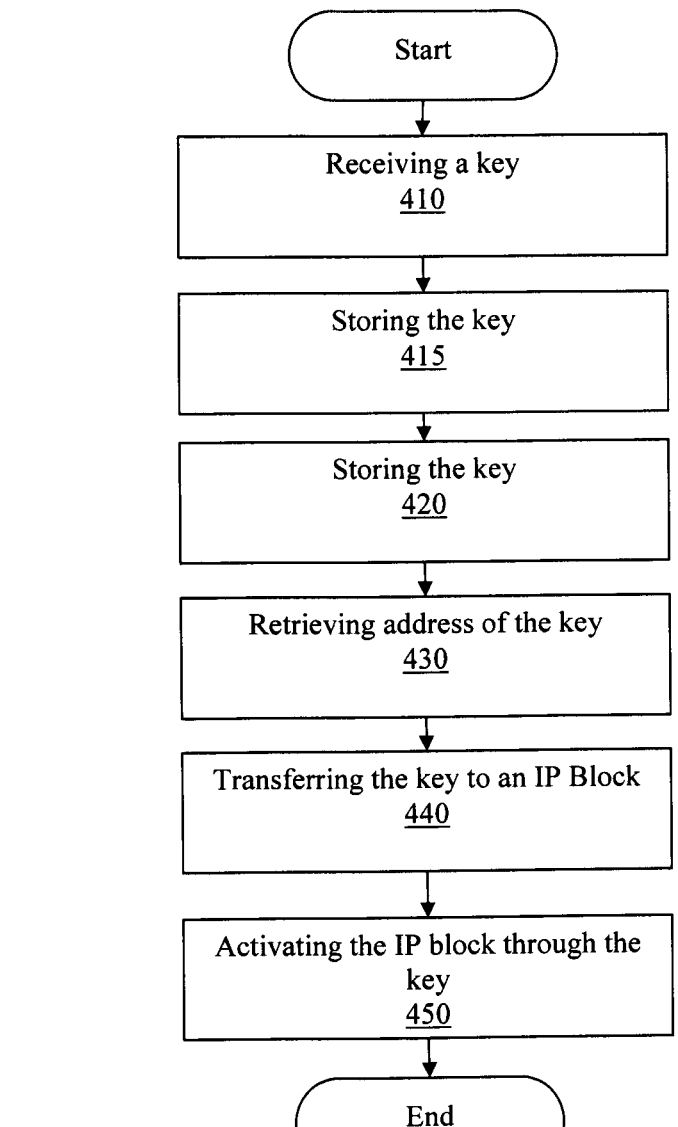
FIG. 4, meant to be illustrative and not limiting, illustrates a method of configuring an IC with an IP protection scheme in accordance with one embodiment.

FIG. 4, meant to be illustrative and not limiting, illustrates a method of configuring an IC with an IP protection feature in accordance with one embodiment. Method 400 can be performed on IC 200 or 330. At step 410, a key is received by the IC. The key is provided to the IC from an external system, e.g. external system 310 of FIG. 3. The key may be received through an IO port. The key may be equivalent to the key referred in FIG. 2 or FIG. 3 in one embodiment. In one embodiment, the key is transferred to the IC based on a standard IO scheme, e.g., a JTAG standard.

At step 415, the enabling circuitry is enabled. The enabling circuitry is only enabled through restricted information available to a device manufacturer or an IP block vendor. If the enabling circuitry has been enabled, the key is routed from the IO port to the memory array 230. At step 420, the key is stored into a memory array, e.g. memory array 230 of FIG. 2, The key is stored in a memory element that has an address identical to the embedded address in the relevant IP block. For example, the key for an IP block maybe routed to the first memory element having the address "000". In another embodiment, the key is stored in the memory array according to the sequential addressing scheme as described above.

At step 430, the embedded address in one of the IP block is retrieved. The enabling key for the IP block is located in the memory element addressable at address '000' as discussed above with reference to FIG. 2. The embedded address in one of the IP blocks enables coupling the memory array and one of the IP blocks. It is appreciated that obtaining a wrong embedded address from the IP block leads to obtaining a wrong key and therefore not activating the IP block.

At step 440, the key is transferred from the memory array to one of the IP blocks through the interconnection. The key is transferred when one of the IP blocks requests the key. In one embodiment, the request is initiated when one of the IP blocks requires activation to enable functionality. In another embodiment, the key is transferred immediately after the IC is powered-up.

At step 450, one of the IP blocks is activated through the key. The activation is carried out when the retrieved key properly enables one of the IP blocks. In one embodiment, one of the IP blocks is activated when the bit sequence forming the key completes the missing portion, i.e. the key hole, in one of the IP blocks.

The embodiments, thus far, were described with respect to programmable logic devices. The method and apparatus described herein may be incorporated into any suitable circuit. For example, the method and apparatus may be incorporated into numerous types of devices such as microprocessors, application specific standard products (ASSPs), application specific integrated circuits (ASICs) and programmable logic devices. Examples of programmable logic devices include programmable array logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs) and field programmable gate arrays (FPGAs), just name a few.

The programmable logic device described herein may be part of a data processing system that includes one or more of the following components; a processor; memory; IO circuits; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the families of devices owned by the assignee.

Although the method of operations were described in a specific order, it should be understood that other operations may be performed in between described operations, described operations may be adjusted so that they occur at slightly different times or described operations may be distributed in a system which allows occurrence of the processing operation at various intervals associated with the processing, as long as the processing of the overlay operations are performed in a desired way.

Although the foregoing invention has been described in some detail for the purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An integrated circuit (IC), comprising:
    a memory array operable to store a key, the key being a sequence of binary bits;
    an Intellectual Property (IP) block operable to perform a function, the IP block is distinct from the memory array and is defined through circuitry of the IC, wherein the IP block has embedded therein an address of the key, and the IP block is operable to be activated with the key; and
    an interconnection operable to couple the memory array to the IP block, wherein the interconnection transfers the key from the memory array to the IP block.

2. The IC in claim 1, wherein the memory array is a non-volatile memory array.

3. The IC in claim 1, wherein the key is stored in the memory array through a sequential addressing scheme.

4. The IC in claim 1, wherein the memory array is a one-time-programmable (OTP) memory array.

5. The IC in claim 1, wherein the IP block has scrambled configuration data, and wherein the key is operable to descramble the scrambled configuration data to enable the functionality of the IP block.

6. The IC in claim 1, wherein the IP block has missing configuration information, and wherein the key provides the missing configuration.

7. The IC in claim 1, wherein the IP block is operable to address a location of the key via the address embedded within the IP block.

8. The IC in claim 1, wherein the key is transferred to the IP block upon activation of the IP block.

9. The IC in claim 1 further comprising:
a port operable to receive the key externally from the IC.

10. The IC in claim 9, wherein the port is a Joint Test Action Group (JTAG) port and wherein the integrated circuit is a programmable logic device.

11. The IC in claim 1, wherein the memory array includes enabling circuitry that is operable to store the key in the memory array.

12. A method to operate an Integrated Circuit (IC), comprising:
transferring a key to a memory array, wherein the key is a sequence of binary bits;
storing the key in a location of the memory array, wherein the location is accessible by an Intellectual Property (IP) block operable to perform a function, wherein the IP block is distinct from the memory array;
embedding in the IP block an address of the location;
transferring the key from the memory array to the IP block; and
enabling the IP block with the key, wherein at least one operation is performed through a microprocessor.

13. The method in claim 12, further comprising:
coupling the IP block to the location of the memory array that stores the key.

14. The method in claim 12, further comprising:
retrieving the key from the location within the memory array.

15. The method in claim 14, further comprising:
attaching the key into a key hole within the IP block, wherein the key hole is missing configuration information of the IP block, and wherein the key provides the missing configuration information operable to be attached with the key hole.

16. The method in claim 14, further comprising:
descrambling configuration information of the IP block via the key.

17. The method in claim 16, wherein the descrambling utilizes one of XOR or Advanced Encryption Standard (AES).

18. The method in claim 12 further comprising:
enabling the memory array to store the key at the location of the memory array.

19. A method of activating an Integrated Circuit (IC):
receiving configuration information that configures at least a portion of circuitry of the IC to perform a function, wherein the portion of the circuitry forms an Intellectual Property (IP) block within the IC;
receiving a key that enables the IP block, wherein the key is a sequence of binary bits, the key is stored in a location within a memory array that is distinct from the IP block, and an address of the key is embedded in the IP block; and
activating the IP block through utilizing the key.

20. The method in claim 19, further comprising:
enabling the memory array to receive the key;
coupling the IP block to the location of the memory array that stores the key; and
transferring the key from the memory array to the IP block.

* * * * *